United States Patent [19]
Schäfer

[11] 3,931,594
[45] Jan. 6, 1976

[54] TRANSVERSE-FLOW LASER CELL AND LASER ARRANGEMENT INCLUDING THE CELL

[75] Inventor: Fritz Peter Schäfer, Gottingen-Nikolausberg, Germany

[73] Assignee: Max-Planck-Gesellschaft zur Forderung der Wissenschaften e.V., Gottingen, Germany

[22] Filed: Jan. 27, 1975

[21] Appl. No.: 544,225

[30] Foreign Application Priority Data
Sept. 4, 1974 Germany............................ 2442325

[52] U.S. Cl.............. 331/94.5 L; 330/4.3; 356/246
[51] Int. Cl.²......................................... H01S 3/02
[58] Field of Search........ 331/94.5 L; 356/181, 246; 330/4.3

[56] References Cited
UNITED STATES PATENTS
3,725,810  4/1973  Ashkin et al................. 331/94.5 L

*Primary Examiner*—William L. Sikes
*Attorney, Agent, or Firm*—Hans Berman

[57] ABSTRACT

The cell of a liquid laser is defined between the rounded, parallel edges of four coaxial cylinder sectors of fused quartz. The narrow gaps circumferentially bounded by the flat, converging side faces of the sectors provide conduits for rapid flow of dye liquid into and out of the cell which extend over the full axial length of the cell. The light of a flash tube is directed toward the cell through the cylindrically arcuate outer face of each sector.

8 Claims, 3 Drawing Figures

TRANSVERSE-FLOW LASER CELL AND LASER ARRANGEMENT INCLUDING THE CELL

This invention relates to lasers employing a fluid filled cell, and more particularly to a transverse-flow cell and to a laser arrangement including the cell of the invention.

In its more specific aspects, the invention is concerned with an improvement in a transverse-flow laser cell of the basic type disclosed by *M. Boiteux et al* (Applied Optics 9, February 1970, pp. 514–515). Transverse flow laser cells have important, well-recognized advantages over cells in which a fluid flows in the direction of the laser beam generated in the cell by radiant pumping energy. The effective flow section of a transverse-flow cell for the laser fluid can be made many times greater than the cross section of the laser beam, thereby avoiding the problems resulting from insufficiently rapid change of the fluid in the cell.

It is a shortcoming of the known transverse-flow cells that they require a pumping arrangement symmetrical relative to a longitudinal plane through the cell axis. When the flash tubes of such an arrangement are precisely focused in the cell, the generally desirable basic mode of the laser is suppressed. If sharp focusing of the pumping light source is avoided by the use of diffuse reflectors, pumping energy does not penetrate the fluid in the cell deeply enough, and the resulting inhomogeneous distribution of the pumping energy in the laser fluid again causes suppression of the basic mode.

An important object of the invention is the provision of a laser cell which may be assembled with three or more sources of pumping energy symmetrically arranged about the longitudinal cell axis so as to enhance the basic mode of laser radiation. A concomitant object is the provision of a cell which further strengthens the advantages of the known transverse-flow cells over the earlier longitudinal flow cells.

According to this invention, there is provided a laser cell which comprises at least three substantially wedge-shaped elements permeable to radiant pumping energy. Two side faces of each element converge toward an edge which is elongated in a direction common to all elements. The edges jointly define there-between a cavity elongated in the afore-mentioned direction and having a longitudinal axis. Each side face and an adjacent side face of another element define therebetween a conduit communicating with the cavity. The circumferential width of the conduit relative to the axis is but a small fraction of the radial and axial dimensions of the conduit. End walls fixedly connect the elements and seal the conduits and the cell cavity in an axial direction, the wall portion sealing the cavity in at least one axial direction being permeable to visible light.

According to another aspect of this invention, a source of radiant pumping energy is associated with each of the wedge-shaped elements. A rear face connects the two afore-mentioned side faces of each element, and the pumping energy of the associated source enters the element through the rear face and is directed to the cell cavity through the edge.

Other features, additional objects, and many of the attendant advantages of this invention will readily be appreciated from the following detailed description of a preferred embodiment when considered in connection with the appended drawing in which.

Figure 1:
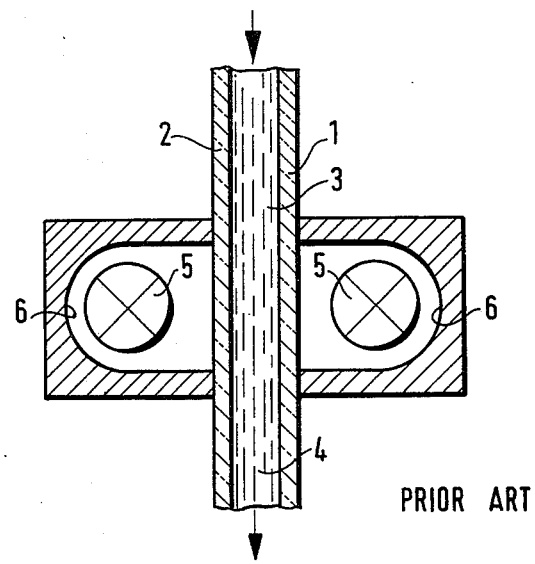
FIG. 1 shows a laser arrangement including a transverse-flow cell of the prior art in section at right angles to the cell axis and the longitudinal plane of symmetry.

Referring initially to FIG. 1, there are shown basic components of a known transverse-flow laser cell and associated elements of a laser. The cell basically consists of two flat quartz plates 1, 2 elongated at right angles to the plane of FIG. 1. A dye solution 3 enters the area between two pumping light sources 5 whose light is focused on the flowing liquid by reflectors 6, and the dye solution 4 partly decomposed in the cell leaves the cell as indicated by arrows. The laser arrangement is symmetrical only relative to a single plane at right angles to the plane of FIG. 1 and including the longitudinal axis of the cell.

Figure 3:
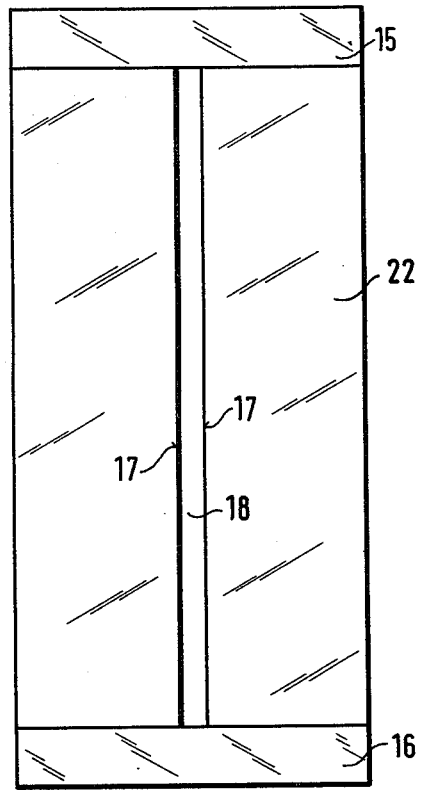
FIG. 3 illustrates the cell of the laser arrangement of FIG. 2 in plan view.
Figure 2:
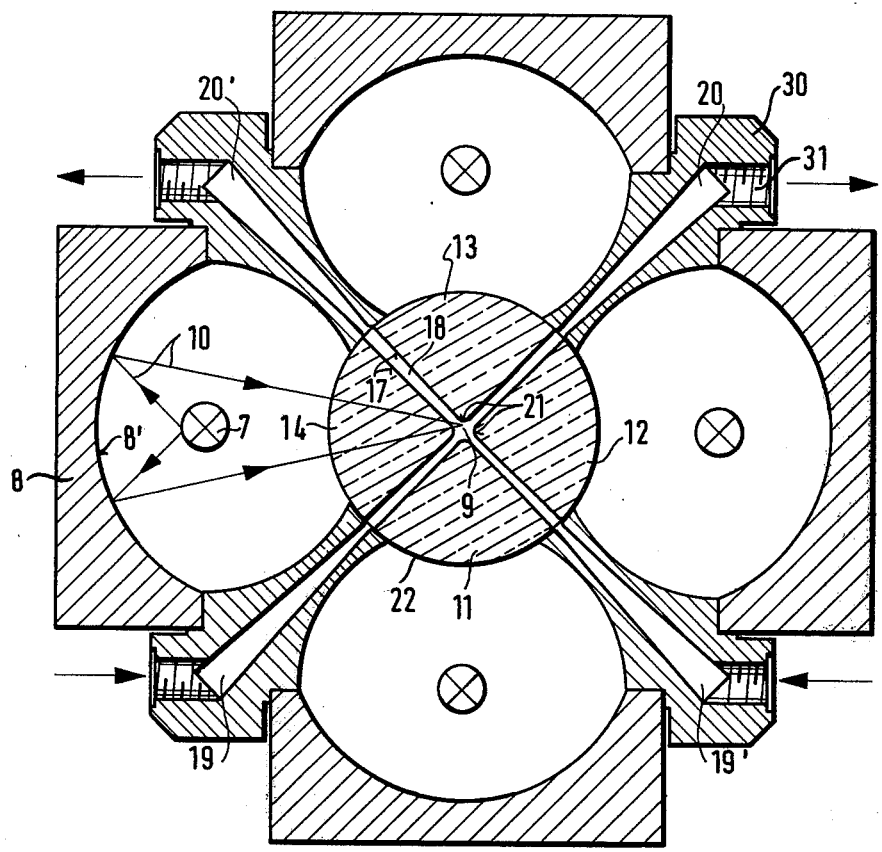
FIG. 2 illustrates a laser arrangement of the invention in a section analogous that of FIG. 1.

A laser arrangement of the invention is shown in FIGS. 2 and 3. The cell cavity 9, elongated at right angles to the plane of FIG. 2, as is evident from FIG. 3, is surrounded by four identical wedge-shaped elements 11, 12, 13, 14 of solid, transparent quartz. Each element has two side faces 17 which converge toward a rounded edge 21, and a rear face 22. The four rear faces 22 are cylindrically arcuate about the axis of the cell cavity 9, and the latter is defined by the four edges 21 which are elongated in a common direction and parallel to the axis of the cell cavity.

The edges 21 are cylindrically convex, and the optically flat side faces 17 are smoothly tangential to the associated edge 21. The side faces 17 of two circumferentially consecutive elements define therebetween a conduit 18 which is axially as long as the cavity 9 (see FIG. 3). The four conduits 18 flare in a radially outward direction at small apex angles so that the sum of the angles enclosed by the four pairs of side faces is smaller than 360°, though much greater than 270°.

The axial ends of the four quartz elements 11, 12, 13, 14 are connected by transverse, optically flat end walls 15, 16 of quartz transparent to visible light, particularly the laser radiation generated in the cell cavity 9. They may be joined to optically flat end faces of the wedge-shaped elements by sintering, as is conventional in itself.

The laser cell consisting entirely of fused quartz is mounted in an assembly of four identical mirror elements 8 and four identical connectors 30. The four connectors 30 have internally threaded tubulures 31 and define respective ducts 19, 19', 20, 20' whose effective flow sections vary in shape from the tubulures 31 to the radially outer orifices of respective associated conduits 18, but are approximately uniform in magnitude. As shown more explicitly in the afore-mentioned paper by *Boiteux et al*, the ducts 19, 19', 20, 20' are of approximately circular cross section contiguously adjacent the tubulures 31, and their cross sections contiguously adjacent the conduits 18 are narrow rectangles conforming to the orifices of the conduits, as seen in FIG. 3. An inner circumferential face of each connector 30 is sealed to two adjacent rear faces 22 by means of silicone rubber gaskets, not shown.

The mirror elements 8 span the circumferential gaps between the connectors 30. Each mirror element 8 has a concavely cylindrical reflecting face 8' offset in a radially outward direction from the rear face 22 of an associated wedge-shaped elements 11–14, and a xenon flash tube 7 extending over the full length of the cell cavity 9 is arranged between the reflecting face 8' and the associated rear face 22 so that a very high proportion of the beams 10 of pumping light radiated by the tube 7 is reflected toward the rear face 22 in a direction radial relative to the latter and is further focused by the rounded edge 21 on the cell cavity.

The latter is supplied with a dye solution through two tubulures 31 and the associated conduits 19, 19' and withdrawn from the cavity 9 through conduits 20, 20' and the tubulures 31 associated with the latter by a circulating pump and other devices known in themselves and not shown. Because of the outward flaring configuration of the conduits 19, 19', 20, 20', the rate of flow in the cell cavity 9 is extremely high.

Optically flat surfaces are preferred on the side faces 17 not only for reasons of optical performance, but to obtain the highest possible flow rate through the laser cell. The basically conventional configuration of the ducts in the connectors 30 is chosen for the same reason. The rounded edges 21 tangentially merging with the side faces 17 avoid turbulence in the cell cavity, but the edges additionally function as condensing lenses for the pumping radiation. In the illustrated laser arrangement, they are preferably cylindrically convex about respective axes spacedly parallel to the axis of the cylinder cavity 9, but an elliptical or parabolical curvature in radial section may be chosen instead of the illustrated circular curvature.

Wedge-shaped cell elements which are sectors of a quartz cylinder and whose rear faces 22 have the same radius of curvature are very conveniently prepared with the necessary precision, but rear faces of different shape are entirely feasible. The wedge-shaped elements 11–14 thus may be replaced by three-sided prisms having side faces 17 and edges 21 as illustrated, but flat rear faces connecting the radially outer edges of the side faces. Similarly, the reflecting faces 8' need not be cylindrical, and the number of wedge-shaped elements and associated sources of pumping radiation may be different from four, at least three being sufficient to achieve the advantages of this invention to some extent. If properly matched, the several wedge-shaped bodies and their associated sources of pumping energy need not be identical, but no advantages are apparent at this time from departing from an arrangement of identical units uniformly distributed about the cell axis in such a manner that the laser arrangement has more than one plane of symmetry, the axis of the cell cavity being entirely located in each of the planes.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A transverse-flow cell for a laser comprising:
   a. at least three substantially wedge-shaped elements permeable to radiant pumping energy,
      1. each element having two side faces converging toward an edge elongated in a direction common to the edges of said elements,
      2. said edges jointly defining therebetween a cavity elongated in said direction and having a longitudinal axis,
      3. each side face and an adjacent side face of another element defining therebetween a conduit communicating with said cavity, the circumferential width of said conduit relative to said axis being but a small fraction of the radial and axial dimensions of said conduit; and
   b. end wall means fixedly connecting said elements and sealing said cavity in said common direction,
      1. said end wall means including a wall portion permeable to visible light and sealing said cavity in one longitudinal direction.

2. A cell as set forth in claim 1, wherein each of said edges is convexly arcuate in cross section.

3. A cell as set forth in claim 2, wherein said edge is circularly arcuate in cross section.

4. A cell as set forth in claim 1, wherein each of said elements has a rear face connecting said side faces and cylindrical about said axis.

5. A cell as set forth in claim 4, wherein said rear faces have the same radius of curvature.

6. A cell as set forth in claim 1, wherein the two side faces of each element define an apex angle, the combined magnitude of said apex angles being less than 360°, but greater than 270°.

7. A cell as set forth in claim 6, wherein said side faces are flat.

8. A laser arrangement comprising a transverse-flow cell as set forth in claim 1, each of said elements having a rear face connecting said side faces, a source of pumping radiation associated with each of said elements, and mounting means mounting each source radially outside the rear face of the associated element.

* * * * *